United States Patent Office 3,822,347
Patented July 2, 1974

3,822,347
MANUFACTURING PROCESS OF A DENTAL REMEDY AND DISINFECTANT
Tadakazu Takahashi, 4–12 Zaimokuza 3-chome, Kamakura, Japan
No Drawing. Continuation-in-part of abandoned application Ser. No. 88,477, Nov. 10, 1970. This application Aug. 23, 1972, Ser. No. 282,979
Int. Cl. A61k 5/00
U.S. Cl. 424—78       7 Claims

ABSTRACT OF THE DISCLOSURE

Manufacturing process of the dental remedy and disinfectant for dental diseases being characterized in the steps consisting of:
reacting at least one phenol compound with formaldehyde or polymers thereof and with interesterification products of vegetable oils or vegetable resins in the presence of catalysts such as organic acids, inorganic acids, alkalis or salts thereof and amines with or without heating;
then stopping said reaction when a viscous intermediate condensate is produced;
leaving the reaction product standing still to cool, whereby oily material separates at the bottom of the reaction container;
collecting the oily material;
rinsing said oily material with water to refine; and
dissolving the rinsed material into alcohol or other organic solvent.

CROSS REFERENCE TO RELATED APPLICATION

This application is a continuation-in-part of U.S. Patent Application Ser. No. 88,477, filed Nov. 10, 1970 and now abandoned.

BACKGROUND OF THE INVENTION

Field of the Invention

This invention relates to an improved manufacturing method for a dental remedy.

State of the Prior Art

A known method for preparing a dental remedy involves reacting either one or a mixture of two or more phenol compounds, such as, guaiacol, creosote and eugenol with formaldehyde or its polymers by heating in the presence of a catalyst such as organic acids, inorganic acids, alkali hydroxides, salts, and amines, stop heating when the whole becomes like millet jelly yielding a viscous intermediate condensate, cool, and let stand. Take up only the oily matter separated in the bottom, wash with water and dissolve with alcohol or any other organic solvent, thus making a remedy for dental clinic and disinfection.

The product is obtained by the above mentioned method as a remedy for dental clinic and disinfection (Japanese Patent Publication No. Sho. 28/8,197 1954) and shows fairly good results clinically. However, in view of histopathology it has rather stronger irritating effect, thus ideal treatment cannot be expected.

To solve such problem and for the purpose of removing such irritation and obtaining superior treatment effect, this invention has been completed after various researches and a member of histopathological and clincial experiments.

SUMMARY OF THE INVENTION

The main purpose of this invention is to prepare a dental remedy. The method comprises preparing an interesterification product of mono- and/or diglycerides of a fatty acid from a mixture at about equivalents of vegetable oils or vegetable resins and glycerine or polyethylene glycol or propylene glycol heated in the presence of catalyst for ester interchange. The interesterification product is mixed with one or a mixture of two or more phenol compounds, such as guaiacol, creosote, cresol, eugenol, resorcinol, with formaldehyde or polymers thereof in the presence of catalyst and heated until the whole becomes like millet jelly yielding viscous intermediate condensate; the heating is stopped, and let stand to cool. The oily matter separated in the bottom is collected, washed with water to purify, and dissolved in a suitable organic solvent such as alcohol to make a remedy for dental clinic and disinfection without causing irritation.

It may also be possible upon application of this invention that instead of the heating reaction of the above stated various esters interchanged from vegetable oils and vegetable resins mixed as the reactant from the beginning with phenol compounds such as guaiacol, creosote, cresol, eugenol, resorcinol and formaldehyde, first one or a mixture of more than two of phenol compounds such as guaiacol, creosote, cresol, eugenol, resorcinol is reacted with heat in the presence of catalyst together with formaldehyde or its polymers, and when about a half of the reaction time is over, ester interchanged vegetable oils or vegetable resins are added and then the latter half of the heating reaction is continued until the whole becomes like millet jelly yielding viscous intermediate condensate, thus in the same way as before it is processed and dissolved with alcohol or any other organic solvents.

To proceed with the reaction in this method the above mentioned heating is necessary to accelerate the reaction within a comparatively short period, however, it may also be possible to obtain the reaction product without heating if it is left for relatively long times (many hours) at the room temperature.

The esters interchanged from vegetable oils and vegetable resins employed in this method can be obtained in the following way: Soybean oil, peanut oil, olive oil, castor oil, rosin, shellac, balsam, etc., as vegetable oils and vegetable resins, are mixed with glycerine or polyethylene glycol or propylene glycol at equivalents, to which calcium soap solutions, zinc soap solutions or zinc oxide is added as the catalyst in the ratio of 0.1–1.0%. Then it is heated for reaction for about 2–3 hours. The interesterification products are thus mono- and diglycerides of fatty acids.

This reaction is explained in the following formula:

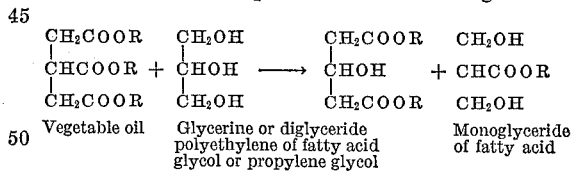

| $CH_2COOR$ | $CH_2OH$ | | $CH_2COOR$ | $CH_2OH$ |
|---|---|---|---|---|
| $CHCOOR$ + | $CHOH$ | ⟶ | $CHOH$ | + $CHCOOR$ |
| $CH_2COOR$ | $CH_2OH$ | | $CH_2COOR$ | $CH_2OH$ |
| Vegetable oil | Glycerine or diglyceride polyethylene of fatty acid glycol or propylene glycol | | | Monoglyceride of fatty acid |

Among those ester interchange compounds of vegetable oils and vegetable resins obtained in the above mentioned manner, it is preferred that the monoglyceride of fatty acid is added to the hot condensation reaction product of the phenol compound and formaldehyde in this invention. According to the results of experiments the less diglyceride the better, however, it should not be necessary to remove all diglyceride. It is considered to be appropriate to use those containing more monoglyceride. Thus, those became monoglyceride and diglyceride could be mixed easily with heat condensed product of phenol compound and formaldehyde or its copolymers, and dissolved, making a uniform mixture, that is the reason why esters interchanged in vegetable oils and vegetable resins are employed.

Generally, one mol of oil or resin is reacted with one mol of glycerine or glycol in order to produce the interesterification product. However, in practice, 0.10 to 1.5 mols of oil is mixed with one mol of the glycerine or glycol.

The amounts of the various reactants can vary over a wide range. Generally, equal molecular weights of phenol compounds and formaldehyde are reacted together to produce the oily viscous condensate. About 0.8 to 1.5 mol parts of the formaldehyde are reacted with about 1 mol part of phenol compounds to produce 1 mol part of the viscous condensate. When an acid catalyst is used, 1–1.5 mols of formaldehyde are used per mol of phenol compound. When an alkali catalyst is used, 0.8–1.0 mols of formaldehyde are used per mol of phenol compound.

Desirably, a catalyst is used for the reaction. Any suitable phenol-formaldehyde condensation catalyst can be used. Examples of such catalysts include salts of barium, calcium, lead, lithium, sodium and zinc acids, metallic soaps of fatty acids and amines including diamines and triamines. Specific examples of such catalysts are:

barium hydroxide
calcium hydroxide
lead oxide
lithium ricinoleate
sodium hydroxide
zinc oxide
lithium naphthenate
sulfuric acid
phosphoric acid
succinic acid (preferably colorless)
octenoic acid
naphthenic acid
urotropin The catalyst is present in the reaction mixture in amounts sufficient to effectively carry out the reaction. Generally, the amount of catalyst ranges from 0.001 to 0.25 mol parts of acid catalyst per mol part of the phenol compound, and from 0.10 to 0.12 mols of alkali catalyst per mol of the phenol compound.

The interesterification product is present in amounts sufficient to effectively reduce the irritating effect of the phenol formaldehyde condensation product. Generally, the interesterification product can range from 0.5 to 1.5 mol or 0.15 to 0.80 weight parts per mol of the phenol compound. The weight part will depend on the type of interesterification product used and the phenol compound used. For example, about 20 to 70 grams of ester interchanged vegetable oil are used per mol of guaiacol and about 40 to 80 grams of ester interchanged olive oil are used per mol of tricresol.

The organic solvent for dissolving the viscous intermediate condensate can be any suitable solvent for the condensate. Examples of such solvents are alcohols such as ethyl alcohol, isopropyl alcohol, propylene glycol and ethylene glycol, or any combination of these compounds.

The organic solvent is used in sufficient amounts to adequately dissolve the viscous condensate. Generally a solution of 15 to 30 weight parts of viscous condensate is dissolved in 85 to 70 weight parts of the solvent.

The pharmacological effects of the product obtained in the method of this invention are same as noted in the specification for the Japanese Pat. No. 212,308. That is, one or more phenol compounds such as guaiacol, creosote, cresol, eugenol, resorcinol is reacted with formaldehyde or its polymers with heat to thus obtain a millet jelly-like viscous intermediate condensate which has considerable antiseptic effect. Such disinfectant works almost semi-permanently. When alcohol or other organic solution of this product or such organic solvent solution, mixed with calcium hydroxide powder or an X-ray contrast medium such as barium sulfate or zinc oxide powder with calcium hydroxide is applied and filled to cavity in the tooth with the dental pulp, pulpar wound or infected root canal, etc. at the time of vital pulpectomy, it well works to dental pulp or pulpar tissue to cure the affected part with effective stimulation. At the same time revealing the sterilization effect, it exterminates the germs, thus prevents reinfection as well as gives effective performance as kneading liquid of the covering agent at the time of vital pulpectomy. Furthermore, tight bonding of formaldehyde intermediate condensate of phenol compound and dental calcareous is even by ion exchange action with $Ca^+$ performed deep in dentinal canal and at the same time said intermediate condensate itself proceeds, its condensation being strongly combined and hardened. Thus, germs present in the dentinal canal are exterminated or tightly sealed being not able to come out again then reinfection can be well prevented.

As stated above, the medicine for dental clinic and disinfection obtained according to the method described in Japanese Pat. No. 212,308 is fairly effective clinically in treatment, however, in view of the histopathology on account of certain strong irritation, it is impossible to receive an ideal effect in treatment. However, as to the way improved by this invention, when one or a mixture of two or more phenol compounds, such as guaiacol, creosote, cresol, eugenol, resorcinol is reacted with formaldehyde or its copolymer in the presence of catalyst with heat, it can be considered that if the reaction is carried by adding esters interchanged in vegetable oils from the beginning or in the midst of the reaction, such added interchanged esters of vegetable oils are chemically bonded with the viscous intermediate condensate of phenol compound and formaldehyde, and furthermore well dissolved in organic solvents as alcohol uniformly, thus interchanged esters of vegetable oil being bonded chemically with viscous intermediate condensate, irritation of such viscous intermediate condensate can be reduced, thus increasing the effectiveness for curing dental diseases.

The invention is explained with the examples as follows:

EXAMPLE 1

Guaiacol _____ 124 g. (1 mol).
37% formaline _____ 112 g. (1.4 mol).
Vegetable oil ester-interchanged ___ 22–66 g.
5%–10% sulfuric acid _____ 0.05–0.15 g.
(0.001–0.003 mol).

The mixture of the above mentioned components is placed into a vessel with reflux condenser and stirrer. Stirring constantly the mixture is heated within a range of 80–100° C. for 20–30 minutes to complete the reaction.

Occasionally, a small amount of reaction fluid is taken out to test its viscosity by cooling. When the viscous intermediate condensate precipitated in the bottom became as viscous millet jelly or a little softer, stop heating and let it stand to be cooled. The viscous oily matter separated in the bottom is then collected, washed and desiccated. The dried product is dissolved with ethyl alcohol properly to make a solution.

EXAMPLE 2

Guaiacol (or wood creosote) _____ 124 g. (1 mol).
37% formaline _____ 80 g. (1 mol).
5%–10% sulfuric acid _____ 0.05–0.15 g.
(0.001–0.003 mol).

The above mentioned mixture is placed in the vessel with reflux condenser and stirrer. While stiring constantly it is heated within a range of 80–100° C. for about 10 minutes to complete the reaction. Then 44–77 g. of ester-interchanged soybean oil or olive oil is gradually added. At the same temperature the mixture is further reacted with stirring for about 10–20 minutes. Occasionally some portion of reaction fluid is taken out and, after cooling the same, viscosity of such condensate reactant is tested. When the condensate precipitated in the bottom is as viscous as millet jelly, or a little softer, heating is stopped and the mixture is cooled and left standing.

The viscous oily matter separated in the bottom is collected, washed with water and desiccated. The product is then properly dissolved in ethyl alcohol to make a solution.

EXAMPLE 3

| | |
|---|---|
| Tricresol | 108 g. (1 mol). |
| 37% formaline | 112 g. (1.4 mol). |
| Ester-interchanged olive oil | 44–77 g. |
| Phosphoric acid | 3.4–8.5 g. (0.1–0.25 mol). |

The above mentioned mixture is placed in the vessel with a reflux condenser and stirrer, is heated to 80° C. and stirred constantly for about 15–20 minutes. Occasionally a small amount of reaction fluid was taken out to test its viscosity. When such condensate became as viscous as millet jelley or a little softer, the heating was stopped, the mixture was cooled, washed with water, desiccated. A proper solution was made with ethyl alcohol. In this case 15–30% alcohol solution was appropriate.

EXAMPLE 4

The following materials are introduced into a reaction vessel:

| | Grs. |
|---|---|
| Castor oil, olive oil, peanut oil, soybean oil, cottonseed oil, rape-seed oil, and coconut oil (vegetable oils: triglyceride of fatty acids) | 60–70 |
| Glycerine or propylene glycol (polyhydric alcohols) | 40–30 |
| Calcium octenoate, zinc, Ca(OH)$_2$. | |

The reaction vessel is fed with $N_2$ gas and heated at 230° C. for 2–3 hours with stirring. The sample of the reaction product is then taken out from the reaction vessel and diluted twice in volume with ethyl alcohol, and if no precipitate is formed at the room temperature, it means that the reaction is completed.

After the reaction, the product is cooled and diluted with proper solvent such as ethyl alcohol. The reaction product consists of monoglyceride, diglyceride and polyglycerine.

EXAMPLE 5

| | |
|---|---|
| Guaiacol | 124 g. (1 mol). |
| 37% formaline | 80 g. (1 mol). |
| Vegetable oil ester-interchanged | 22–66 g. |
| Alkali catalyst (as NaOH) | 0.4–0.5 g. (0.1–0.12 mol). |

Guaiacol, 37% formaline and NaOH solution were taken in a round bottomed flask with reflux condenser and a stirrer, and the mixture was heated to 80° C. for 6 hours, and then to 90–95° C. for 2 hours. The condensation product settled in the lower layer, and an aqueous solution was formed in the upper layer. The upper layer was separated from the lower layer by decantation. The condensation product thus obtained was distilled under vacuum until it became transparent and its one drop dropped on a cold glass plate kept transparent. The condensation product prepared thus was in a viscous rubber-like form. It was dissolved in alcohol, and to the alcoholic solution was added an esterified vegetable oil to produce a suitable base for the remedy.

When formaline two times as much as the amount above was used, it was difficult to prepare a viscous base suitable for the remedy, and the base formed couldn't be taken out of the vessel.

In the viscous condensate produced by the process as mentioned above, monoglyceride of fatty acid exists chemically bonded with components of condensed matter. Thus, the fact of containing monoglyceride of fatty acid means less irritation of the remedy against living body, and almost no irritation was confirmed by the histopathological experiments.

From such fact the remedy obtained by the process of this invention is extremely effective and appropriate to be used for treatment of dentinal canal, as root canal filler such as calcium hydroxide, or to be used as kneading fluid of covering agent powder at the time of vital pulpectomy.

Furthermore, on that product obtained by this invention it was recognized that it is extremely effective as the remedy for dental diseases, specially for infected root canal with strong infectious symptoms, or covering agent for the vital pulp. The remedy produced by this method has nearly no irritation and by alteration of mixing ratio accordingly due to the status of each dental disease conditions, it is possible to produce a remedy which will meet all the necessary conditions.

The embodiments of the invention in which an exclusive property or privilege is claimed are defined as follows.

I claim:

1. In a process for the preparation of a dental disinfectant wherein at least one phenol compound is reacted in the presence of a catalyst with formaldehyde, wherein said phenol compound and formaldehyde are present in amounts sufficient to produce a viscous intermediate condensate, the reaction is stopped when the viscous intermediate condensate has been produced, the reaction product is allowed to stand and cool until an oily material is separated from the reaction product and the oily material is recovered, the improvement which comprises:

admixing with said viscous intermediate condensate at least one of a mono- or diglyceride of a fatty acid prepared by reacting at or above room temperature for at least 2 hours 0.1 to 1.5 mols of a vegetable oil or vegetable resin selected from the group consisting of soybean oil, peanut oil, olive oil, and castor oil, resin, shellac, and balsam with 1 mol of glycerine or propylene glycol, said mono- or diglyceride being present in amounts sufficient to effectively reduce the irritating effects of said intermediate condensate on human tissue.

2. The process of claim 1 in which said phenol compound is selected from the group consisting of guaiacol, creosote, cresol, eugenol and resorcinol.

3. The process of claim 1 in which said mono- or diglyceride is added to the reaction mixture subsequent to the start of the reaction between said phenol compound and said formaldehyde compound.

4. The process of claim 1 in which said catalyst is sulfuric acid.

5. The process of claim 1 in which said catalyst is phosphoric acid.

6. The process of claim 1 in which said oily material, after recovery, is washed with water and dissolved in an organic solvent.

7. The process of claim 6 in which said organic solvent is ethyl alcohol.

No references cited.

RICHARD L. HUFF, Primary Examiner

U.S. Cl. X.R.

424—312